(12) United States Patent
Sintorn

(10) Patent No.: US 11,976,707 B2
(45) Date of Patent: May 7, 2024

(54) SPRING RATE ADJUSTER

(71) Applicant: Öhlins Racing AB, Upplands Väsby (SE)

(72) Inventor: Torkel Sintorn, Vaxholm (SE)

(73) Assignee: Öhlins Racing AB, Upplands Väsby (SE)

( * ) Notice: Subject to any disclaimer, the term of this patent is extended or adjusted under 35 U.S.C. 154(b) by 657 days.

(21) Appl. No.: 17/259,786

(22) PCT Filed: Jul. 12, 2019

(86) PCT No.: PCT/EP2019/068890
§ 371 (c)(1),
(2) Date: Jan. 12, 2021

(87) PCT Pub. No.: WO2020/012015
PCT Pub. Date: Jan. 16, 2020

(65) Prior Publication Data
US 2021/0148431 A1 May 20, 2021

(30) Foreign Application Priority Data

Jul. 13, 2018 (EP) ...................................... 18183424

(51) Int. Cl.
| F16F 9/44 | (2006.01) |
| B62K 25/04 | (2006.01) |
| B62K 25/06 | (2006.01) |
| F16F 9/06 | (2006.01) |
| F16F 9/088 | (2006.01) |

(52) U.S. Cl.
CPC ................ *F16F 9/44* (2013.01); *F16F 9/062* (2013.01); *F16F 9/063* (2013.01); *F16F 9/088* (2013.01);
(Continued)

(58) Field of Classification Search
CPC .... F16F 9/44; F16F 9/062; F16F 9/063; F16F 9/088; F16F 2222/12; F16F 2228/066;
(Continued)

(56) References Cited

U.S. PATENT DOCUMENTS 8,869,959 B2 * 10/2014 Yablon .................... F16F 9/466
188/319.1
2002/0175035 A1 11/2002 Achenbach
(Continued)

FOREIGN PATENT DOCUMENTS

| EP | 2450591 A2 | 9/2012 |
| EP | 2862745 A2 | 8/2014 |
| GB | 2072302 A | 9/1981 |

OTHER PUBLICATIONS

European Patent No. EP 3594527 to Sintorn published on Jan. 15, 2020.*

(Continued)

*Primary Examiner* — Pamela Rodriguez
(74) *Attorney, Agent, or Firm* — Öhlins Racing AB

(57) ABSTRACT

The present disclosure relates to a shock absorber (100) including a cylinder (7), a piston rod (2) and a piston (6) attached to the piston rod (2). The piston (6) is arranged in the cylinder (7) and a damping chamber including a damping media is defined in the cylinder (7). The shock absorber (100) further includes a gas spring in functional connection with the damping chamber and at least one characteristic of the gas spring is adjustable by a user-adjustable feature arranged within the piston rod, wherein the user adjustable feature affects the enclosing area of the damping chamber, thereby indirectly affecting the gas spring through the functional connection.

12 Claims, 2 Drawing Sheets

(52) U.S. Cl.
CPC ........ *B62K 2025/048* (2013.01); *B62K 25/06* (2013.01); *F16F 2222/12* (2013.01); *F16F 2228/066* (2013.01); *F16F 2230/0005* (2013.01); *F16F 2230/186* (2013.01); *F16F 2232/08* (2013.01); *F16F 2234/02* (2013.01)

(58) Field of Classification Search
CPC ......... F16F 2230/0005; F16F 2230/186; F16F 2232/08; F16F 2234/02; B62K 25/06; B62K 2025/048
See application file for complete search history.

(56) References Cited

U.S. PATENT DOCUMENTS

| | | | |
|---|---|---|---|
| 2006/0118374 A1* | 6/2006 | Wallen | F16F 9/44 188/318 |
| 2012/0080279 A1 | 4/2012 | Galasso et al. | |
| 2014/0210146 A1 | 7/2014 | Aoki | |
| 2015/0323035 A1* | 11/2015 | Coaplen | F16F 9/065 188/269 |
| 2016/0375951 A1* | 12/2016 | Gilbert | F16F 9/3488 188/280 |
| 2017/0356518 A1* | 12/2017 | Gustafsson Vallander | F16F 9/5126 |
| 2021/0003191 A1* | 1/2021 | Yoon | F16F 9/34 |

OTHER PUBLICATIONS

Chinese Second Office Action dated Jul. 4, 2022 regarding Chinese Application No. 201980046347.0 (English translation not available) (6 pages).

International Searching Report and Written Opinion of the International Searching Authority regarding International Application No. PCT/EP2019/068890 dated Oct. 16, 2019 (9 pages).

* cited by examiner

SPRING RATE ADJUSTER

CROSS-REFERENCE TO RELATED APPLICATIONS

This application is a national stage of, and claims priority to, Patent Cooperation Treaty Application No. PCT/EP2019/068890, filed on Jul. 12, 2019, which application claims priority to European Application No. EP 18183424.3, filed Jul. 13, 2018, which applications are hereby incorporated herein by reference in their entireties.

FIELD

The present specification generally relates to the field of suspensions and in particularly discloses a shock absorber with adjustable air spring characteristics.

BACKGROUND

Shock absorbers and damping systems are used for damping of the relative movement between the wheel and the chassis of a vehicle, such as a car, a motorcycle or a bicycle. Conventionally, bicycles are provided with a shock absorbing fork and sometimes also a shock absorbing rear wheel suspension. Such shock absorbers generally include a damping unit and a coil spring or an air spring. If it is deemed necessary to change spring characteristics of a coil spring shock absorber, pre-tensioning can generally be adjusted by an adjustable counter surface and if the spring rate needs to be adjusted, another coil spring having the desired properties can be used. When it comes to adjustments of prior art gas spring shock absorbers, the pressure in one or more air chambers can normally be adjusted by adding or removing gas therefrom and if the spring rate needs to be changed, volume spacers can be rearranged, removed and/or replaced in order to obtain the wanted setup.

BRIEF DESCRIPTION OF THE DRAWINGS

The disclosure will be understood through the following illustrative and non-limiting detailed description of preferred examples, with reference to the appended drawing, on which.

DETAILED DESCRIPTION

Figure 1:
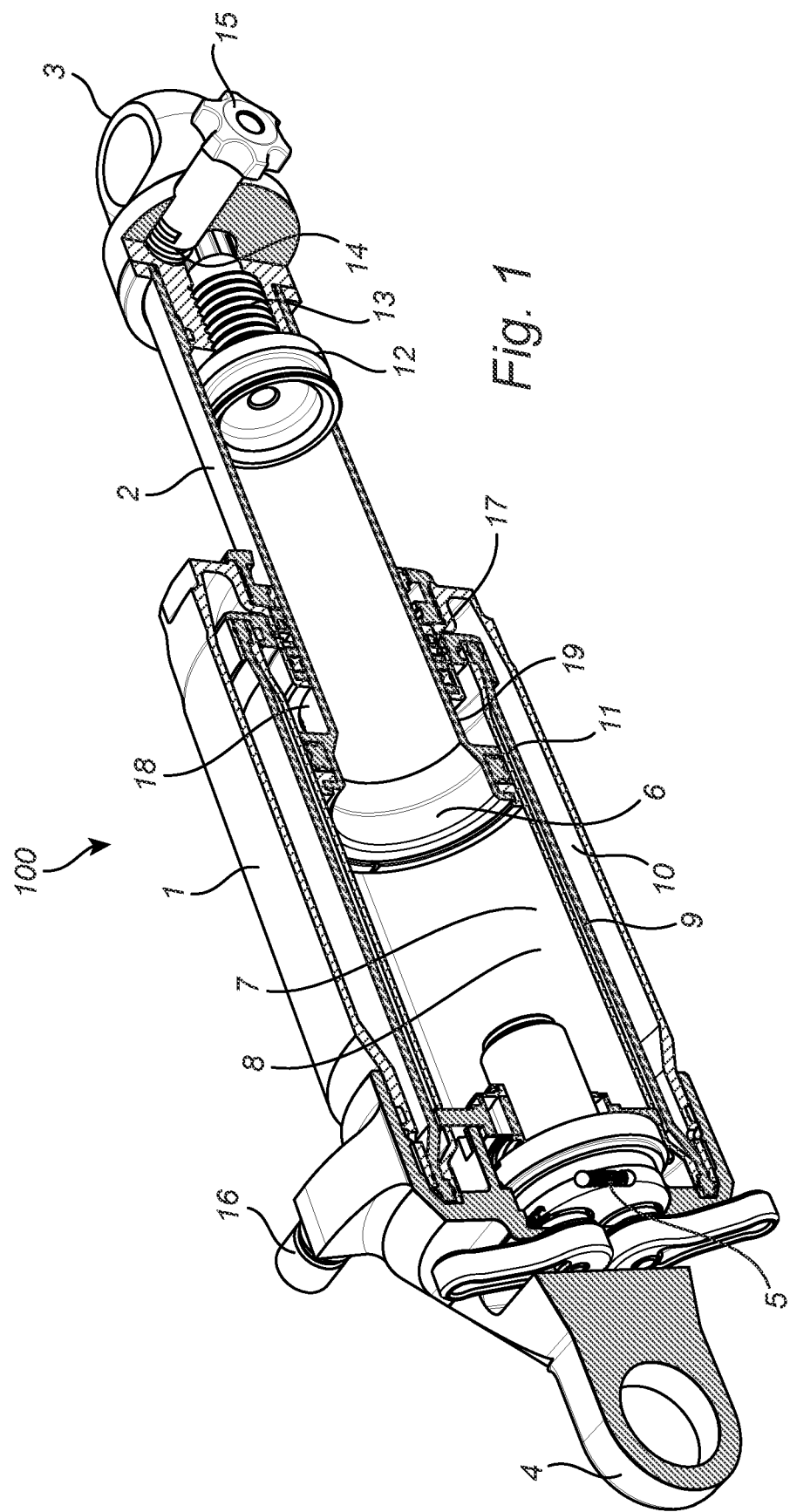
FIG. 1 shows a perspective cross sectional view of a shock absorber in a first state according to a first aspect of the present disclosure.

It would be desirable to provide an improved shock absorber where at least one characteristic of the air spring can be readily adjusted without having to disassemble the shock absorber and which does not require any, or at least very few, tools and a minimum of technical skills. The disclosure is based on the realization that a characteristic of the air spring in a hydropneumatic shock absorber can be changed from the outside by affecting indirectly the gas spring through the chamber containing the damping media. Since the damping media is incompressible and by arranging the gas spring and the damping chamber in functional connection with each other, it is possible to change the volume available to the gas spring by changing the enclosing area of the damping chamber. E.g. by reducing the available volume within the shock absorber, the volume available to the gas spring will be reduced and e.g. the spring rate will be affected.

According to a first aspect of the disclosure a shock absorber is provided which includes a cylinder, a piston rod and a piston attached to the piston rod. The piston is arranged in the cylinder and a damping chamber including a damping media is defined in the cylinder. Further, the shock absorber includes a gas spring which is in functional connection with the damping chamber and at least one characteristic of the gas spring is adjustable by a user-adjustable feature which is arranged within the piston rod. This user adjustable feature affects the enclosing area of the damping chamber, thereby indirectly affecting the gas spring through the functional connection between the two. Hereby, a shock absorber is achieved which is easy and quick to adjust and which do not require any special tools or skills. In comparison with the very time consuming and elaborate work of replacing volume spacers as it is required in prior art shock absorbers, the shock absorber of the present disclosure invites a user to frequently experiment with different setups, thereby contributing to the achieving of an optimized suspension setup. With the prior art solution, the user would typically abstain from adjusting the volume spacers and accept the original setup, simply because it involved too much and too complicated work. The shock absorber of the present disclosure also allows for adaptation to different oil volumes. If, for example during maintenance, the oil level of the shock absorber is not refilled to the exact same level as that prior to maintenance, the shock absorbers of the prior art would not have the same setup as prior to maintenance. With the present disclosure, a differing oil level can be compensated for my means of the user adjustable feature. During manufacture, all shock absorbers can be given the same properties even though the oil level may vary to a certain extent between the separate shock absorbers. With the present disclosure, this can be compensated for and all shock absorbers leaving manufacturing can be given the exact same properties. In addition to spring rate adjustments, this construction also permits a user to change ride height of e.g. a bike for a given gas spring pressure and consequently the spring pressure can also be changed for a given ride height.

According to one example, the at least one characteristic of the gas spring is indirectly adjustable by adjusting the space available to the gas spring. A change in the volume available to the gas spring will have an immediate effect on the spring characteristics. This since the mass of the gas contained within the gas spring will remain the same, also with changing volume.

According to one example, the air spring and the positive chamber are separated by means of a flexible medium. The use of a flexible medium, such as a bladder is a simple and effective way of creating a functional connection between the damping medium and the gas spring.

According to one example, the user adjustable feature includes a moveable piston arranged within the piston rod. The arrangement of a moveable piston within the piston rod of the shock absorber allows for easy and exact adjustment of the enclosing area of the damping chamber. This arrangement also allows for the user adjustable feature to be accessed from the outside. This is not possible with the volume spacers of the prior art solutions.

According to one example, the moveable piston is moveable within the piston rod through a threaded connection. A threaded connection can be made with a suitable pitch and offers very good fine tuning possibilities.

According to one example, the moveable piston is adjustable from the outside by means of a worm drive. A worm drive is a well proven and reliable option that also offers the possibility of transferring movements from one direction into another. In this case, if the shock absorber is a rear shock absorber of a bicycle, the piston of the user adjustable feature may be arranged to move in a direction generally in parallel and possibly also coaxial with a longitudinal axis of the piston rod. However, the end of the piston rod, outside of the shock absorber, normally includes a bushing or similar attachment to the linkage of a rear suspension and it will not be possible to arrange a turning knob or similar in line with the movement of the piston of the user adjustable feature. With a worm drive on the other hand, you can arrange a knob with e.g. 90 degrees offset, making it easily accessible for a user.

According to one example, the air spring includes a compression spring chamber and a rebound spring chamber. Having two separate chambers makes it possible to e.g. counteract so-called stiction in the shock absorber. Stiction is the static friction that needs to be overcome to enable relative motion of stationary objects in contact, e.g. between the piston and the cylinder of the shock absorber. It also helps obtaining a desirable spring rate.

According to one example, a pressure balancing port is arranged on the piston rod. The pressure balancing port interconnects the compression spring chamber and the rebound spring chamber of the gas spring. This pressure balancing port makes it possible to balance the pressure in the two chambers of the gas spring such that the properties of the gas spring remain constant, or at least similar, over time. Otherwise, there is a risk that as the pressure in one or both chambers sink over time, which is more or less unavoidable, the balance between the two chambers will change, thus spoiling suspension set up. Furthermore, one of the chambers may be located within the shock absorber such that it is hard or even impossible to access it from the outside for adjusting gas pressure. With the solution of the present disclosure, one of the chambers, for example the rebound spring chamber, can be pressurized by the other chamber, for example the compression spring chamber, through the pressure balancing port.

According to one example, the pressure balancing port will interconnect the compression spring chamber and the rebound spring chamber at a predetermined point during a stroke of the piston rod. The position is chosen such that the correct balance between the two chambers is obtained and can be positioned such that pressure balancing will occur frequently enough to maintain balance over time.

According to a second aspect of the disclosure, there is provided a method for adjusting a characteristic of a gas spring in a shock absorber. The shock absorber including a cylinder, a piston rod and a piston attached to the piston rod. The piston is arranged in the cylinder and wherein a damping chamber including a damping media is defined in the cylinder. The shock absorber further includes a gas spring in functional connection with the damping chamber, and a user-adjustable feature arranged within the piston rod. The method includes the step of indirectly adjusting at least one gas spring characteristic by applying the user adjustable feature and wherein the user adjustable feature affects the enclosing area of the damping chamber, thereby indirectly affecting the gas spring through the functional connection.

According to one example, a characteristic is a ride height of the shock absorber. For example, by reducing the volume available for the gas spring, the ride height can be increased.

According to one example, a characteristic is a spring rate of the shock absorber. By varying the volume available for the gas spring, the spring rate of the gas spring can be adjusted.

According to one example, a characteristic is a balance between a compression spring chamber and a rebound spring chamber of the shock absorber. By varying the volume available to the compression spring chamber while the rebound spring chamber maintains its volume, the balance between the two can be adjusted.

According to a second aspect of the disclosure, there is provided a bicycle including a shock absorber as previously described. The shock absorber may be a front fork or a rear shock absorber.

All figures are schematic, not necessarily to scale, and generally only show parts which are necessary in order to elucidate the disclosure, wherein other parts may be omitted or merely suggested. Throughout the figures the same reference signs designate the same, or essentially the same features.

Further, although the figures all relate to a shock absorber as it may be embodied for a rear shock absorber for a bicycle, it would be possible to carry out the disclosure in a front suspension as well, for example in the form of a front fork. The advantages of the present disclosure apply just as well on vehicles other than bicycles, such as other air sprung sport, leisure and recreational vehicles, for example roller chairs, mono skies, sprung boat chairs etc. It may also be possible to apply the disclosure to other parts of a bicycle, such as a suspended steering bar or a seat post.

FIG. 1 illustrates a shock absorber 100 including an outer shell 1, a piston rod 2, first and second suspension linkage attachments 3, 4. The shock absorber further includes valve arrangement 5 including for example adjustable low speed compression and rebound valves. Further adjustable valves may be provided but are not discussed further herein. The shock absorber 100 further includes a piston 6 arranged at a first end of the piston rod 2. The piston 6 is arranged to be moveable inside a cylinder 7 and a damping chamber is defined in the shock absorber 100, the damping chamber including a compression damping chamber 8 and a rebound damping chamber 11 and a damping medium, such as oil. Arranged between the outer shell 1 and the cylinder 7 is a flexible membrane 9, such as a bladder, which divides the space between the outer shell 1 and the cylinder 7 into different compartments. One of the compartments is a compression spring chamber 10 and another is the rebound damping chamber 11, separated by the flexible membrane 9. The compression damping chamber 8 and the rebound damping chamber 11 are connected through the valve arrangement 5 such that during a compression stroke of the piston 6, damping medium will pass through the valve arrangement 5 into the rebound damping chamber 11. This will cause the rebound damping chamber 11 to expand via the flexible membrane 9 at the expense of the compression spring chamber 10, thus compressing the compression spring chamber 10. During a rebound stroke, the compression spring chamber 10 of the gas spring will force damping medium from the rebound damping chamber 11 back through the valve arrangement 5 into the compression damping chamber 10. Arranged within the hollow piston rod 2 is an adjustable feature in the form of a moveable piston 12 coupled to the piston rod through a threaded connection 13. The position of the piston 12 is adjustable by means of knob 15 which is connected to the piston 12 by means of a worm drive 14. The worm drive 14 will convert turning of the knob 15 into rotation of the threaded connection 13 of the piston 12 thus creating a longitudinal displacement of the piston 12 within the piston rod. Such longitudinal movement will affect the total available volume within the shock absorber 100 and since the damping medium of a shock absorber is more or less incompressible, a change in available volume must be accommodated by the gas spring. Gas, which in shock absorbers typically is air, is compressible and therefore a change in the position of the piston 12 will indirectly adjust the characteristic of the gas spring. To set the pressure in the compression spring chamber 10, a valve 16 is arranged on the shock absorber. In addition to the compression spring chamber 10, the gas spring includes a rebound spring chamber 18 arranged on rebound side of the main piston 6 and sealed in the other direction by sealing and bushing arrangement 17. This rebound spring chamber 18 is connected to the compression spring chamber 10 by means of a pressure balancing port 19 arranged on an outer surface of the piston rod 2. At a certain point during the stroke of piston rod 2, this pressure balancing port 19 has the function of interconnecting the rebound spring chamber 18 and the compression spring chamber 10, overriding the sealing and bushing arrangement 17 such that the pressures in the rebound spring chamber 18 and the compression spring chamber 10 will be equalized. The pressure balancing port 19 helps maintaining the same or at least similar gas spring characteristics over time. Without this, the pressure, in particular in the smaller rebound spring chamber 18, will decrease and create a misbalance between the two chambers. Furthermore, at least in some examples of the disclosure, the rebound spring chamber 18 is not accessible from the outside and the only way of pressurizing it is to pressurize the compression spring chamber 10 through valve 16 and then move the piston rod 2 such that the pressure balancing port 19 will interconnect the two chambers. Thus, this arrangement gives the freedom to arrange the rebound spring chamber 18 freely inside shock absorber without having to make sure it can be accessed from the outside through a valve or similar.

Figure 2:
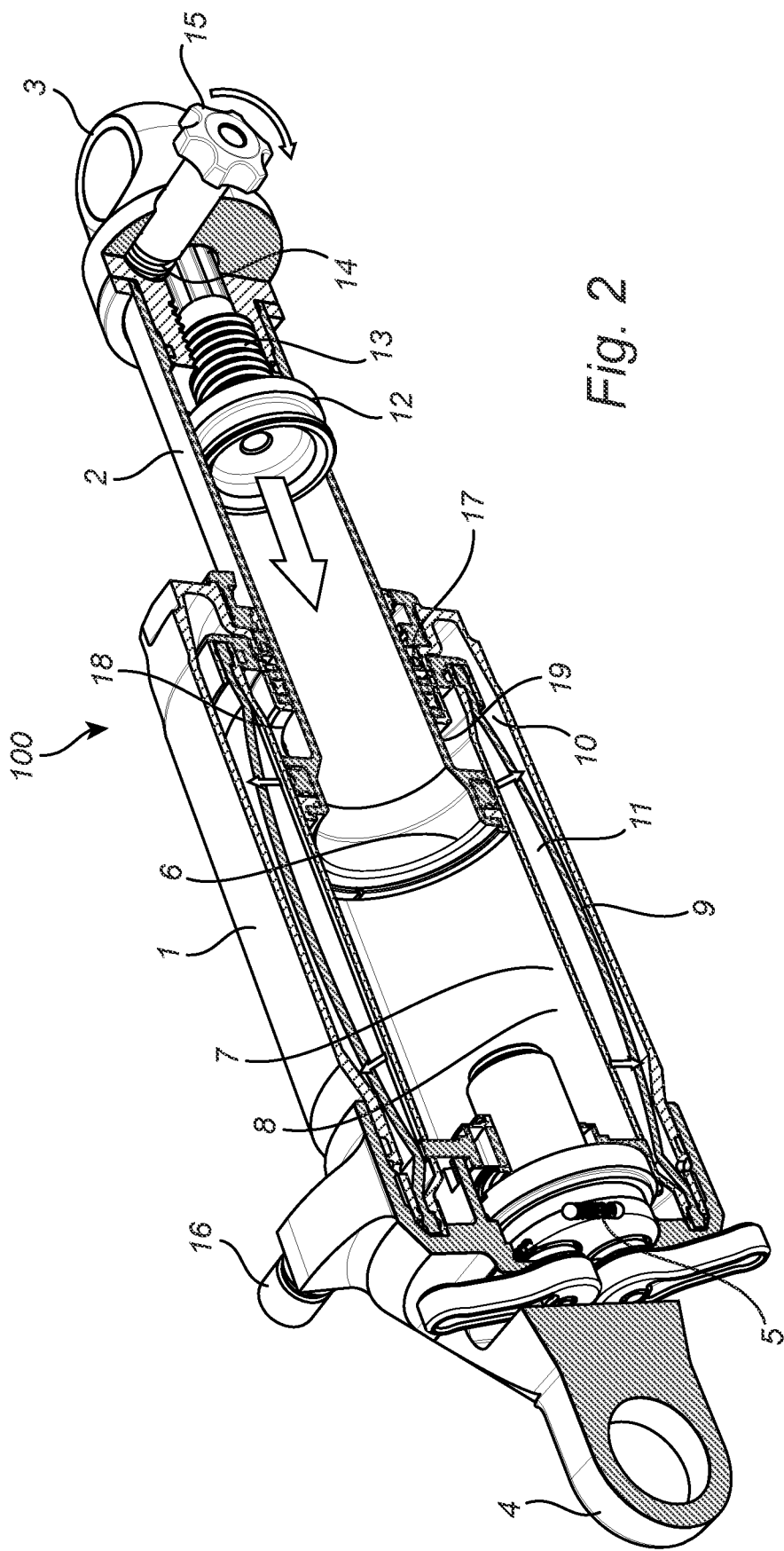
FIG. 2 shows a perspective cross sectional view of a shock absorber in a second state according to a first aspect of the present disclosure.

FIG. 2 shows an identical cross section as in FIG. 1 but here it can be seen how displacement of piston 12 longitudinally towards the main piston 6, causes the flexible membrane 9 to bulge into the compression spring chamber 10 which would imply an increased spring rate of the gas spring and/or an increased ride height of the shock absorber.

Another advantage with the present disclosure resides in the fact that the piston 12 is arranged inside piston rod 12. This solution does not add to the overall length of the shock absorber and it does not require any adaptations of the attachments 3 and 4 in comparison with a regular shock absorber. Further, the arrangement of adjustment knob 15 connected to the piston 12 through a worm drive 14 also allows for adjustments from the outside in a convenient manner. Especially considering the fact that shock absorbers on e.g. bicycles are arranged in intricate linkages with sometimes very limited space and since the placement of attachment 3 is a common solution, the example of the present disclosure with knob 15 arranged with a 90 degree offset to the longitudinal direction of the piston rod 2 is convenient.

The present disclosure provides the possibility to adjust a number of characteristics of the gas spring of a shock absorber. For example, the spring rate of the gas spring can be adjusted by reducing or increasing the volume available inside the shock absorber to the gas spring, for example the compression spring chamber 10. The mass of the gas, typically air, in the gas spring will remain the same and therefore the spring rate of the gas spring will change with the available volume. Larger available volume will reduce the spring rate and a reduced volume will increase the spring rate. In addition to changing the spring rate, it is also possible to change a ride height of a shock absorber 100 at a given pressure, here defined as the position of the main piston 6 in the cylinder 7. Furthermore, it will also be possible to change the balance between the compression spring chamber 10 and the rebound spring chamber 18 due to the fact that the volume of the compression spring chamber is adjustable whereas the rebound spring chamber remain the same. The present disclosure may also simplify manufacturing and service of the shock absorber since it makes it possible to compensate for an inaccurate amount of oil in the shock absorber. If too little or too much oil is used in the damping chamber, the piston 12 is simply moved to compensate for this.

The invention claimed is:

1. A shock absorber comprising a cylinder, a piston rod with a piston attached to the piston rod, wherein the piston is arranged in the cylinder and wherein a damping chamber comprising a damping media is defined in the cylinder, wherein the shock absorber further comprises a gas spring in functional connection with the damping chamber, wherein at least one characteristic of the gas spring is adjustable by a user-adjustable feature arranged within the piston rod, wherein the user adjustable feature affects an available volume of an enclosing area of the damping chamber, thereby indirectly affecting the gas spring through the functional connection.

2. A shock absorber in accordance with claim 1, wherein the at least one characteristic of the gas spring is indirectly adjustable by adjusting the space available to the gas spring.

3. A shock absorber in accordance with claim 1, wherein the gas spring and the damping chamber are separated by means of a flexible membrane.

4. A shock absorber in accordance with claim 1, wherein the user adjustable feature comprises a moveable piston arranged within the piston rod.

5. A shock absorber in accordance with claim 4, wherein the moveable piston is moveable within the piston rod through a threaded connection.

6. The shock absorber of claim 5, wherein the movable piston has a larger diameter than the threaded connection.

7. A shock absorber in accordance with claim 4, wherein the moveable piston is adjustable from the outside through a worm drive.

8. A shock absorber in accordance with claim 1, wherein the gas spring comprises a compression spring chamber and a rebound spring chamber.

9. A shock absorber in accordance with claim 8, wherein a pressure balancing port is arranged on the piston rod, the pressure balancing port interconnecting the compression spring chamber and the rebound spring chamber of the gas spring.

10. A shock absorber in accordance with claim 9, wherein the pressure balancing port will interconnect the compression spring chamber and the rebound spring chamber at a predetermined point during a stroke of the piston rod.

11. The shock absorber of claim 9, wherein the balancing port is between distal ends of the piston rod.

12. The shock absorber of claim 8, wherein the rebound spring chamber is on a rebound side of the piston.

* * * * *